Patented Dec. 5, 1922.

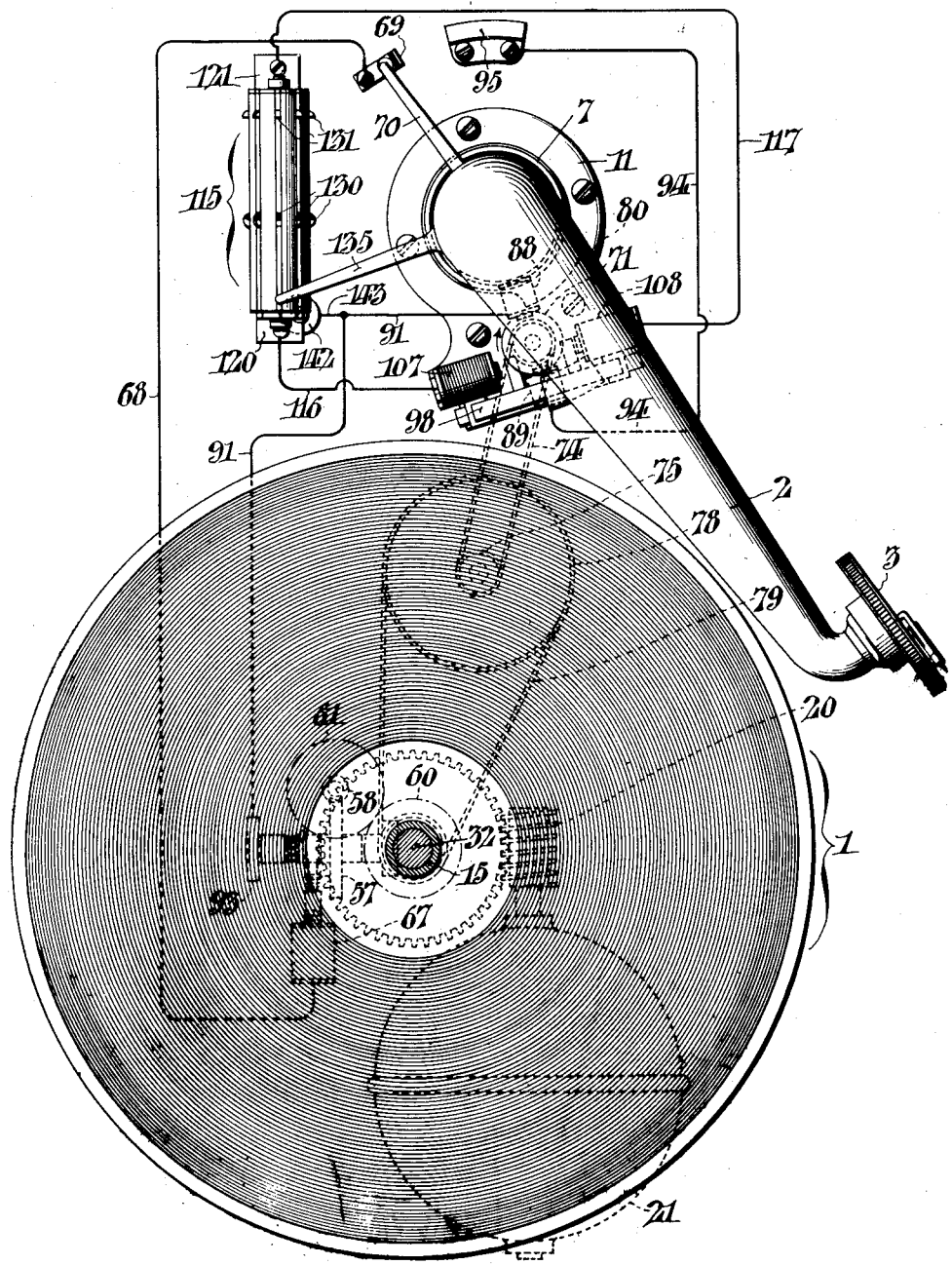
FIG. I.

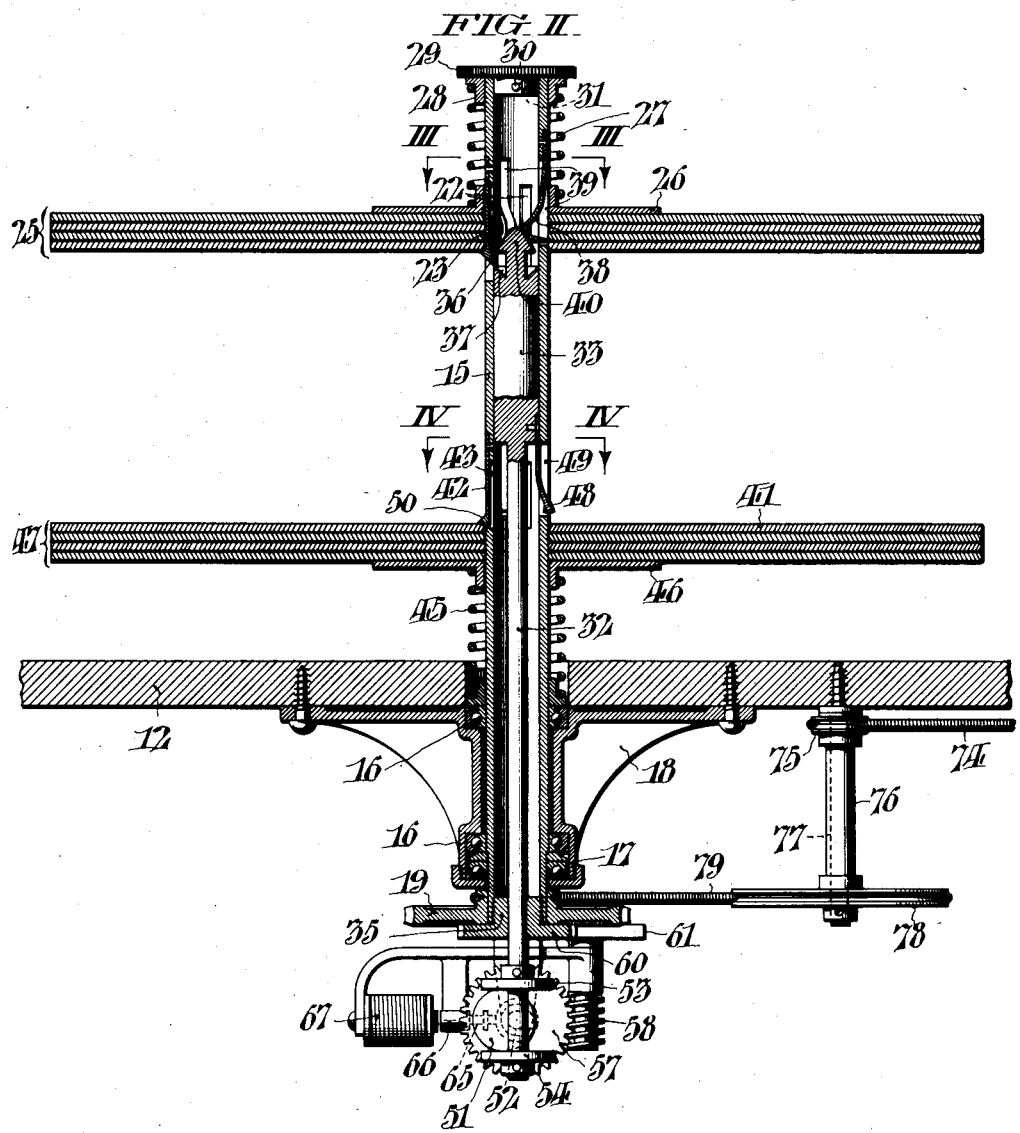

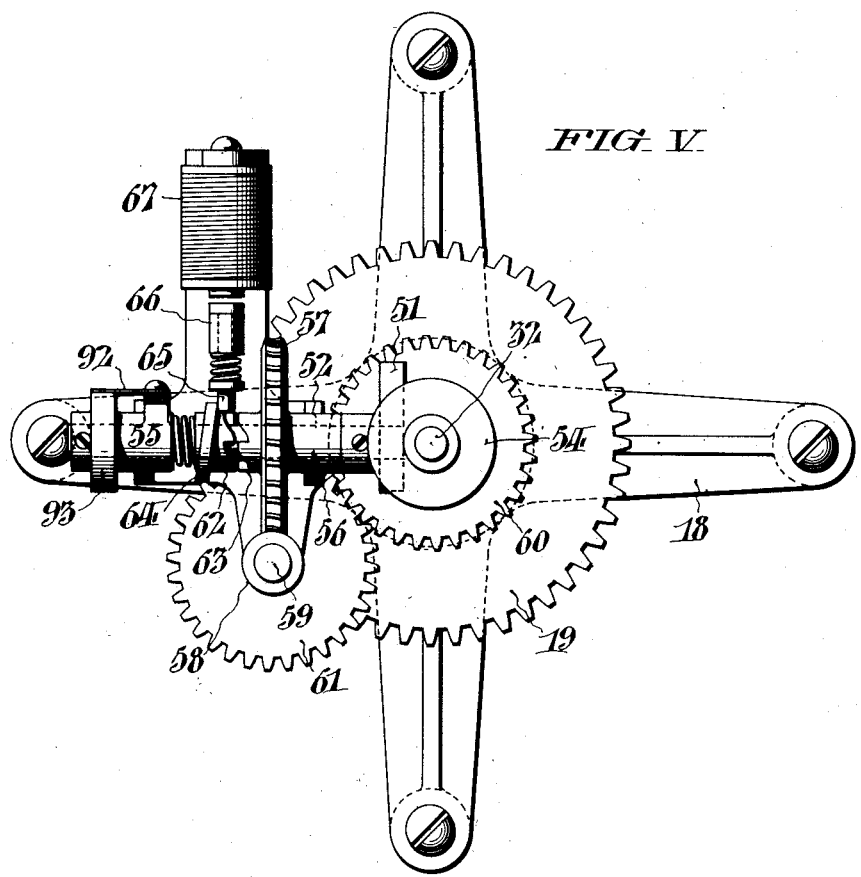
FIG. V.
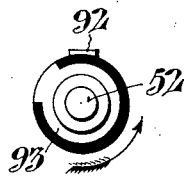
FIG. VI.

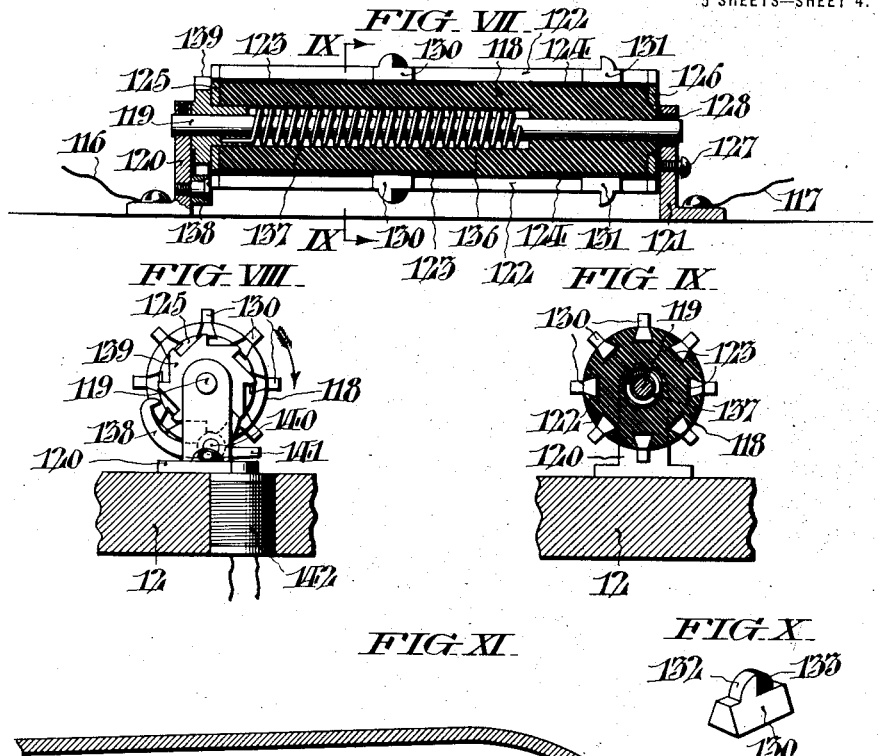

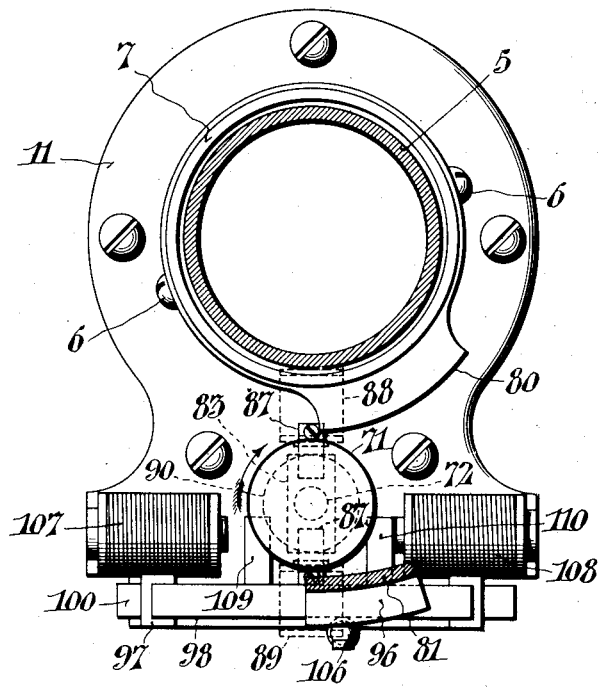
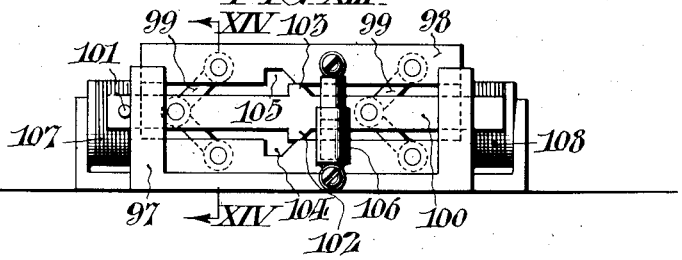
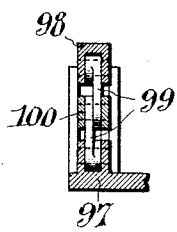

1,438,000

UNITED STATES PATENT OFFICE.

GEORGE H. UNDERHILL, OF PHILADELPHIA, PENNSYLVANIA; LOUISE U. HUSSEY, OF WESTFIELD, MASSACHUSETTS, ADMINISTRATRIX OF SAID GEORGE H. UNDERHILL, DECEASED.

PHONOGRAPH.

Application filed October 27, 1917. Serial No. 198,781.

*To all whom it may concern:*

Be it known that I, GEORGE H. UNDERHILL, a citizen of the United States, residing in Philadelphia, county of Philadelphia, and State of Pennsylvania, have invented certain new and useful Improvements in Phonographs, whereof the following is a specification, reference being had to the accompanying drawings.

The invention relates to phonographs and more particularly to automatic multiplaying devices of this character.

As herein shown, the invention is illustrated in connection with a disk type having means for the automatic successive transfer of the records to playing position and the actuation of the reproducer in proper timed relation in reproducing the records thus presented.

The invention further comprehends adjustable means whereby the reproducer is actuated in accordance with the beginning and ending of the groove in each individual record, so that the playing may be accurately controlled.

Fig. I, is a plan view of a phonograph conveniently illustrating my invention.

Fig. II, is a vertical sectional view through the multiple record carrier and its driving connection.

Figs. III, and IV, are detail cross sectional views through the spindle of the record carrier on an enlarged scale and designated respectively by the arrows III—III and IV—IV in Fig. II.

Fig. V, is an inverted plan view on an enlarged scale of the driving mechanism for the record carrier also showing the devices for effecting the changing of the records.

Fig. VI, illustrates a rotary switch included in the mechanism shown in Fig. V.

Fig. VII, is a longitudinal sectional view through the controlling device for the tone arm through the instrumentality of which said arm is at the proper time lowered into playing engagement with the record or raised therefrom after the record has been played.

Fig. VIII, is an elevation of the controlling drum as viewed from the left of Fig. VII.

Fig. IX, is a detail cross sectional view of the same taken on line IX—IX of Fig. VII.

Fig. X, illustrates in perspective one of the adjustable contacts carried by the controlling drum.

Fig. XI, is a sectional view through the tone arm and the parts immediately associated therewith for actuating the same in automatic playing.

Fig. XII, is a plan sectional view along the line XII—XII of Fig. XI.

Fig. XIII, is an elevation of the mechanism for raising and lowering the tone arm with respect to the records, and, Fig. XIV, is a detail cross sectional view along the line XIV—XIV, in Fig. XIII.

In the illustration of Fig. I, which is more or less diagrammatic in character, the record carrier is represented at 1, the tone arm at 2, and the reproducer at 3. The reproducer is of well known construction and is attached to the free end of the tone arm. The tone arm is mounted to swing freely over the record about its pivotal attachment, within a limited angle. As shown in Fig. XI, the inner down-turned end 5, of the tone arm is pivoted by means of screws 6, to a collar 7, mounted for free rotation about the protruding neck 8, of an inverted horn not shown, and held in place by a screw 9, engaging in a circumferential groove 10, in the said neck piece. The universal connection thus afforded permits both vertical and horizontal angular movement of the tone arm in a manner well understood. The neck 8, is integrally formed with a flange 11, which is rigidly screwed to the supporting plate 12, of the machine.

The record carrier constructed according to my invention is adapted for holding a plurality of records which are successively automatically shifted into playing position. Referring to Fig. II, it will be noted that said record carrier comprises a vertical tubular spindle 15, which extends well above the supporting plate 12, and after passing through the same is journalled with the interposition of ball bearings 16—16, and thrust bearing 17, in a bracket 18, rigidly screwed to the under face of the supporting plate. Fixed to the lower end of spindle 15, is a gear 19, which is driven by a worm 20, on the shaft of an electric motor 21, (Fig. I). The record carrier is by this means constantly rotated.

Near its top, spindle 15, is provided with a series of elongated longitudinal slots 22, within each of which is adapted to play the free end of a spring stop 23. Each of these stops is riveted or otherwise secured at its upper end to the spindle. In charging the carrier, a plurality of centrally pierced disk records 25, are placed upon the spindle and these are held in position against the stops 33, by an annular pressure plate 26, under the influence of a coiled spring 27, which encircles the spindle and is resisted at the top by a collar 28. Said collar is held in place by a removable cap piece 29, having laterally projecting pins 30, adapted to engage with retaining notches 31, formed in the spindle. By withdrawing cap piece 29, collar 28, spring 27, and pressure plate 26, may be removed from the spindle to permit loading or unloading of the carrier.

Within the hollow spindle is received a longitudinally shiftable slide rod 32, which is provided at its upper end with a plunger 33, and at its lower end is guided in a screw threaded plug 35. Stops 23, are provided with inclined cam faces 36, adapted to cooperate with a correspondingly inclined recess 37, formed in the shoulder at the top of the plunger 33. As the rod 32, is raised, the co-action of these cam faces results in retracting the spring stops 23, whereby the lower record of the series 25, is released and drops by gravity to playing position in a manner to be described later.

In order to prevent the feeding of more than one record at a time, a series of auxiliary or safety stops 38, have been provided. These auxiliary stops are formed of spring metal and also play in elongated slots 39, in the spindle 15, which alternate with those of the main stops 23. Said auxiliary stops normally assume the retracted position illustrated in Fig. II, but in record changing, they are thrust forward simultaneously with the retraction of the main stops when releasing the lowermost record of the series 25, as previously described. This is accomplished by the conical head 40, formed upon an extension of the plunger 33, see also Fig. III. Thus when a record is released, the auxiliary stops are projected to temporarily retain the next succeeding record, so that upon the subsequent shifting of the slide rod back to the position illustrated, the auxiliary stops are permitted to retract while the main stops are, under their inherent spring action, automatically projected to hold the entire series 25, of unplayed records in opposition to the pressure of coiled spring 27.

The records are successively dropped by gravity to the playing position shown at 41, in Fig. II, which position is determined by still another series of spring stops 42. These, like the others already described, play in longitudinal receiving slots 43, formed in the spindle 15. Acting in opposition to stops 42, is a coiled spring 45, which, by exerting pressure upon a plate 46, is effective upon the record series designated at 47. Thus, the upper face of the record to be played is held at the level of the stops 42, notwithstanding the number of accumulated played records.

A record, released from the unplayed stack as above noted, is positively depressed into position beneath the stops by the downward movement of the slide rod 32, with the aid of the instrumentalities about to be described. Fixed to the lower end of the plunger 33, is a series of depending spring dogs 48, which alternate with the detaining stops 42, and are free to play within similar slots 49, also formed in the spindle. These dogs normally occupy the illustrated position, but when the slide rod is moved upward in releasing a record, the force of the dropping record is sufficient to overcome the spring pressure of the dogs and consequently the said record rides over the same and comes to rest upon the inclined faces 50, of the detaining stops 42. Upon the succeeding downward movement of the rod 32, the released record will be engaged by the dogs 48, and forced into playing position beneath the detaining stops 42. During this positive action, the said stops will automatically yield by reason of the engagement of their inclined faces 50, with the aperture in the record, and at the same time, the added thickness of each succeeding record will be automatically compensated for by the coiled spring 45.

The slide rod 32, is reciprocated by a disk 51, eccentrically mounted upon a shaft 52, and adapted to engage between a pair of collars 53, and 54, fixed upon the protruding end of said rod. Shaft 52, is journalled in bearings 55, and 56, integrally formed with the bracket 18, and is adapted to be intermittently rotated in controlling the changing of the records. Mounted for free rotation upon shaft 52, is a gear wheel 57, driven by a worm 58, on a shaft 59, which is in turn constantly driven from the spindle 15, by means of interposed spur gears 60, and 61, see Fig. V. Shaft 52, is directly driven by worm wheel 57, through a clutch comprising a notched collar 62, splined to said shaft and designed to engage the notched hub 63, of said wheel. Collar 62, is spring pressed toward said wheel, but is normally held disengaged by the co-action of an inclined cam ridge 64, upon said collar with a pin 65. Said pin is slidably held in a boss 66, also integrally formed with bracket 18, and is spring pressed forward so as to normally occupy the illustrated position. This mechanism is rendered active by an electro magnet 67, effective in retracting the pin 65, whereupon the clutch collar 62, is immediately automatically pressed into engagement with worm wheel 57. As a consequence, shaft 52, will be turned precisely through one revolution, during the latter half of which the pin 65, again automatically slips forward and gradually withdraws the clutch collar 62, from engagement with worm wheel 57. The magnet 67, is connected through a conductor 68, in circuit with a spring contact 69, (Fig. I) which is co-operative with a finger 70, projecting radially from the downturned inner end of the tone arm, and the method of controlling the same will be deferred for later description.

The mechanism for the angular shifting of the tone arm will be best understood by reference to Figs. I, XI, and XII. This mechanism includes a rotating disk 71, fixed to the top end of a vertical shaft 72. Said shaft carries at its lower extremity a sheave 73, driven by a flexible belt 74, from a similar sheave 75, (Figs. I and II) formed upon a sleeve 76, and mounted for rotation upon a fixed stud 77, screwed into the lower face of plate 12. Sleeve 76, also carries a sheave 78, which is in turn driven by a belt 79, from a sheave formed in the hub of the worm wheel 19, fixed upon the record carrier spindle 15. By this arrangement, and through the proportioning of the parts thus far described, disk 71, is constantly driven at a greatly reduced speed with respect to that of the record carrier.

Disk 71, is adapted to engage either with an arced segment 80, integrally formed with the collar 7, for the tone arm 2, or with an arced bracket 81, depending from the said arm. In order to permit this, shaft 72, is mounted in a bearing 83, capable of oscillation in a vertical plane corresponding to the plane of the paper in Fig. XI. Bearing 83, is received in a socket 84, integrally formed with flange 11, and shaft 72, is held in position by a pin 85, engaging a circumferential groove 86. These elements are normally maintained in the neutral illustrated position by means of a pair of leaf springs 87—87, operative upon the upper flattened face of the bearing 83. Shaft 72, is oscillated by the action of magnets 88, and 89, effective upon a rotating armature 90, fixed upon the lower end of said shaft. By reference to Fig. XII, it will be seen that when disk 71, is moved into engagement with segment 80, the tone arm will be swung outwardly and this action occurs after a record has finished playing. When disk 71, engages with segment 81, the tone arm is moved inwardly to begin playing a new record. Magnet 88, is connected through conductor 91, with a spring brush 92, see Figs. I, V, and VI, co-operative with a rotary switch collar 93, fixed to the end of shaft 52, already described in connection with the record changing mechanism. Magnet 89, is connected through a conductor 94, in circuit with a fixed contact segment 95, which is also co-active with finger 70, Fig. I. The method of control of magnets 88, and 89, through these connections will be later disclosed in the description of operation.

It further remains to raise and lower the tone arm into and out of playing contact with the record and this is accomplished by the following mechanism. As shown in Figs. XI, and XII, the depending bracket 81, terminates in a laterally extending shoe 96, which moves above a collapsible elevating device comprising a fixed bracket 97, which serves as a guide for a parallel movable member 98. Vertical motion of this member is produced by toggle link connections 99—99, with an intermediate slide bar 100, also guided in bracket 97. When slide bar 100 is moved to the right, as viewed in Fig. XIII, as far as permitted by the stop pin 101, member 98, will be moved to the illustrated position and will be thus positively retained by the automatic intervention of projections 102, and 103, formed upon slide bar 100, between the fixed and movable members 97, and 98. The length of this elevating device is such as to comprehend the complete range of movement of the depending bracket 81, of the tone arm, so that, upon the expansion of this device, the tone arm will be immediately raised to a position wherein the playing needle will be correspondingly raised clear of the level of engagement with the record irrespective of the angular position of the said arm. When the device is collapsed, the inclined cam faces of the projections 102, and 103, will cooperate with corresponding inclinations respectively formed in the recesses 104, and 105, in the adjacent edges of the members 97, and 98. This co-action will tend to retard the collapse of the mechanism under the weight of the tone arm and retardation is further assisted by a pneumatic dash pot 106, of any approved construction and interposed between the fixed and movable members 97, and 98, respectively. Such retardation protects the records by preventing a sudden dropping of the tone arm. It will be noted that the relative proportioning of the slide bar projections and the co-operative recesses is such that only a slight motion to the left of said bar will be sufficient to render the collapsing automatic under the weight of the tone arm as above described. Sliding movement of bar 100, is effected by a pair of electro magnets 107, and 108, which are respectively associated with armatures 109, and 110, fixed upon said bar, see Figs. XI and XII. Magnets 107, and 108, are in circuit with a controlling device comprehensively indicated at 115, in Fig. I, through interposed conductors 116, and 117, respectively.

Controlling device 115, further illustrated in detail in Figs. VII, VIII, and IX, consists of a cylinder 118, of electro-insulating material freely mounted upon a fixed shaft 119, whose ends are secured in brackets 120, and 121, fast to the supporting plate of the machine. Said cylinder is provided with a series of longitudinal peripheral slots 122, corresponding in number to the record capacity of the carrier 1. The floor of each of these slots is lined with metallic strips 123, and 124, whose inner ends are spaced sufficiently to be completely insulated from one another. Strips 123, are all soldered to or otherwise united with a metallic annulus 125, which, through intermediate metallic parts, is in electric circuit with bracket 120, to which the terminal end of conductor 116, is connected. Strips 124, are likewise united with a common annulus 126, at the opposite end of the cylinder, and this is in turn in circuit with bracket 121, through the frictional contact of a screw 127. It will be noted from Fig. VII, that bracket 121, is entirely free from metallic communication with bracket 120, by virtue of an insulating bushing 128. The terminal end of conductor 117, already referred to, is connected to bracket 121. Each of the cylinder slots 122, is dovetailed in cross section (Fig. IX) and adapted to receive a pair of contact blocks 130, and 131, the former of which communicates electrically with strip 123, while the latter is likewise communicative with strip 124. Blocks 130, and 131, are practically identical in that each is formed with a rounded projection 132. Stop 130 is, however, provided as illustrated in Figs. VII, and X, with an insulating piece 133, which is an exact counterpart of its rounded projection 132 in curvature, though said piece 133 extends somewhat beyond the center of the curved portion of the block, as shown in Fig. X. By this construction contact 130, is rendered "dead" on one side. These paired contacts are co-operative with a second resilient finger 135, also projecting radially from tone arm 2, and designed to move over the controlling cylinder in the plane of projections 132, of said blocks. Each pair of contacts corresponds to one of the records in the stack upon the carrier and they are capable of being independently adjusted along the slots 122, of the cylinder in accordance with the beginning and ending of the particular record which they control. Through the electrical connections with magnets 107, and 108, said contacts are functional in operating the elevating device in raising and lowering the tone arm at the proper periods as will be subsequently described. In order to intermittently rotate the controlling cylinder 118, in bringing the paired contacts successively into active position in accordance with the changing of the records, the following mechanism has been devised:

Cylinder 118, is axially bored as at 136, to receive a coiled spring 137, having one end attached to the fixed shaft 119, and the other to the cylinder. This spring tends to rotate said cylinder in the direction of the arrow in Fig. VIII, in opposition to an escapement stop 138, which is co-active with a ratchet 139, fixed to the left hand end of the cylinder, Fig. VII. Escapement stop 138, is pivoted about a fulcrum 140, and is otherwise of the usual construction, except that it is provided with a projection 141, serviceable as an armature and capable of actuation by an electro-magnet 142. Said magnet is connected through a conductor 143, with conductor 91, and for this reason also controlled from the rotary switch 93. Thus, when this magnet is energized, the escapement will allow the cylinder to be rotatively shifted to the extent of one tooth of the ratchet 139, in bringing a new set of contacts to active position under resilient finger 135.

The operation of the phonograph is as follows:

Assuming that a new record has just been brought to playing position and shaft 52, of the record changing mechanism (Figs. V, and VI) has almost completed its rotation, the exposed metallic portion of rotary switch disk 93, will establish a circuit through conductor 91, thereby energizing magnet 88. Rotary armature 90, will as a result be attracted, thereby swinging rotating disk 71, into engagement with the depending segment 81, of tone arm 2. By this action, the tone arm will be swung inwardly over the record until the playing stylus of the reproducer is in position directly over the beginning of the record groove. The extent of the return motion thus imparted to the tone arm is controlled by the proper proportioning of the metallic segment of the rotary switch disk 93, so that the circuit through the magnet 88, is maintained for a period sufficient to ensure the proper action of the roller 71, in its effect upon the depending segment 81, of said tone arm. In this way, the tone arm is swung horizontally to the proper playing position relative to the beginning of the record groove. Just at the completion of this inward angular movement of the tone arm, the radial finger 135, will make contact with the projection block 130, of the controlling drum 118, thereby establishing circuit through magnet 107. When thus energized, said magnet will cause the slide bar 100, to be moved to the left (Fig. XIII) thereby allowing arm 2, to drop to actual playing position. Control of the tone arm is thereafter transferred to the record groove in the usual manner, (the arm 135 riding over and passing the contact 130) until playing is finished. By this time arm 135, will have advanced, under the control of the record groove, into contact with block 131, of controlling cylinder 118, (said block having been previously properly set) and the circuit through conductor 117, to magnet 108, closed. Slide rod 100, is thereupon automatically shifted to the right Fig. XIII, and the tone arm raised, so that the playing stylus is clear of the record. As the tone arm is thus raised, the radial finger 70, is coincidently lowered into contact with fixed sector 95, which results in establishing the circuit through conductor 94, and magnet 89. Said magnet becomes immediately effective in attracting rotary armature 90, to swing disk 71, into engagement with segment 80, thereby swinging the tone arm outwardly to the position shown in Fig. I. It will be noted that the fixed contact 95, is of such proportions as to keep this circuit closed for a time interval commensurate with the extent of the required movement of the tone arm. Segment 80, is likewise proportioned in consideration of the above. During the final portion of the movement just described, finger 70, engages spring contact 69, to establish the circuit through conductor 68, and magnet 67. The record changing mechanism is thereby set in motion in a manner already described and all the other parts remain in the position illustrated in Fig. I, until the changing mechanism has completed its cycle of operations during the very last portion of which the rotary switch 93, again establishes the circuit which it controls in effecting the beginning of a repetition of the sequence of operations just described.

It will be remembered that the rotary switch also controls the circuit through magnet 142, so that the drum 118, is shifted contemporaneously with each record change, to bring the corresponding controlling contact blocks 130, and 131, into operative position.

In moving clockwise, finger 70, is ineffective in closing the circuit by reason of an insulating piece 69ª attached to the "dead" side of the spring contact 69 as clearly shown in Fig. I, and furthermore, before said finger reaches fixed contact sector 95, the same will be raised from the plane thereof by reason of the downward movement of tone arm to playing position. Likewise finger 135, in its return movement is ineffective upon block 130, by reason of insulating piece 133.

The phonograph will in this manner be automatically operated until all the records have been played, whereupon the controlling cylinder 118, may be manually restored to its initial position and the records likewise removed from the machine or again positioned for playing.

Having thus described my invention, I claim:

1. In a phonograph, the combination of a reproducer; means for bringing said reproducer into and out of playing position; and means for automatically varying and controlling the action of said means in accordance with the beginning and ending of the record grooves of a set of records.

2. In a phonograph, the combination of a reproducer; and means for automatically bringing said reproducer into and out of playing position in accordance with the beginning and ending of the groove in each record, including means for positively moving said reproducer to inactive position after one playing of a record and means for positively moving it to active position.

3. In a phonograph, the combination of a record carrier; a reproducer; electro-magnetic means for bringing said reproducer into and out of playing position; and means for automatically varying and controlling the action of said electro-magnetic means in accordance with the beginning and ending of the record grooves in each of a set of records.

4. In a phonograph, the combination of a record carrier; a reproducer; a pivoted support for said reproducer; means for bringing said reproducer into and out of playing contact with a record, including an electromagnet for causing movement of said reproducer to active position, and an electromagnet for causing movement of the reproducer to inactive position; and means for selectively controlling the energization of said magnets in correspondence respectively to the beginning and ending of the record.

5. In a phonograph, the combination of a record carrier; a reproducer; a pivoted support for said reproducer; means for bringing said reproducer into and out of playing contact with a record, including an electromagnet for causing movement of said reproducer to active position, and an electromagnet for causing movement of the reproducer to inactive position; a contact finger carried by the support for said reproducer and movable therewith; a pair of contacts co-operative with said finger and each respectively connected in circuit with one of said magnets; and means for adjusting said contacts to selectively control the energization of said magnets in correspondence respectively with the beginning and ending of the record.

6. In a phonograph, the combination of a record carrier; a reproducing means; a movable support for the said reproducer; a rotating disk; devices carried by said reproducer support adapted to co-operate with said disk in shifting the reproducer into or out of playing position; and means for causing corresponding selective engagement between said disk and shifting devices.

7. In a phonograph, the combination of a record carrier; a reproducing means; a pivoted support for said reproducing means; a pair of segments concentric with the pivot of said support; a rotating disk; and means for causing said disk to engage one or the other of said segments in moving the reproducing means into or out of playing position.

8. In a phonograph, the combination of a record carrier; a reproducing means; a pivoted support for said reproducing means; a pair of segments concentric with the pivot of said support; a rotating disk; a shaft for the said disk; a pivoted bearing for said disk; and means for swinging said bearing, whereby said disk is caused to engage one or the other of segments in moving the reproducing means into or out of playing position.

9. In a phonograph, the combination of a record carrier; a reproducing means; a pivoted support for said reproducing means; a pair of segments concentric with the pivot of said support; a rotating disk; means for causing said disk to engage one or the other of said segments in moving the reproducing means into or out of playing position; and means for normally retaining said disk in a neutral position between the said segments.

10. In a phonograph, the combination of a record carrier; a reproducing means; a pivoted support for said reproducing means; a pair of segments concentric with the pivot of said support; a rotating disk; a shaft for the said disk; a pivoted bearing for said disk; a pair of electromagnets; an armature carried by the said shaft; and means for selectively controlling said magnets in swinging said bearing, whereby said disk is caused to engage one or the other of said segments in moving the reproducing means into or out of playing position.

11. In a phonograph, the combination of a record carrier; a reproducing means; a pivoted support for the said reproducer; a parallel device for raising the said reproducer from playing contact with the record including a fixed member and a movable member; and toggle links connecting said members; and means for actuating said toggles to project the said movable member to engage said support for the reproducer.

12. In a phonograph, the combination of a record carrier; a reproducing means; a pivoted support for the said reproducer; a parallel device for raising the said reproducer from playing contact with the record, including a fixed member and a movable member, a slide bar interposed between said members, and toggle links connecting said members with the slide bar; and means for actuating said slide bar to project the said movable member to engage said support for the reproducer.

13. In a phonograph, the combination of a record carrier; a reproducer; a pivoted support for said reproducer; and a parallel device for raising said reproducer from playing contact with a record including a fixed member, a movable member adapted to be projected to engage the support for the reproducer, a slide bar interposed between said members, toggle links connecting said bar with said members; and means controlled in coordination with movement of said slide bar for locking said device in expanded position.

14. In a phonograph, the combination of a record carrier; a reproducer; a pivoted support for said reproducer; and a parallel device for raising said reproducer from playing contact with a record including a fixed member, a movable member adapted to be projected to engage the support for the reproducer, a slide bar interposed between said members, toggle links connecting said bar with said members, and lugs formed on said bar adapted to engage the adjacent edges of said members to lock said device in expanded position.

15. In a phonograph, the combination of a record carrier; a reproducer; a pivoted support for said reproducer; a parallel device for raising said reproducer from playing contact with a record including a fixed member, a movable member adapted to be projected to engage the support for the reproducer, a slide bar interposed between said members, toggle links connecting said bar with said members; means for locking said device in expanded position controlled by movement of said slide bar, with means for shifting said slide bar to disengage said locking means; and means for retarding the collapse of said parallel device when released by movement of said slide bar.

16. In a phonograph, the combination of a record carrier; a reproducer; a pivoted support for said reproducer; a parallel device for raising said reproducer from playing contact with a record including a fixed member, a movable member adapted to be projected to engage the support for the reproducer, a slide bar interposed between said members, toggle links connecting said bar with said members; means for locking said device in expanded position; means for shifting said slide bar to disengage said locking means; with means for retarding the collapse of said parallel device, including cam faces on said slide bar and cooperating recesses in said members.

17. In a phonograph, the combination of a record carrier; a reproducing means; a pivoted support for the said reproducer; a parallel device for raising the said reproducer from playing contact with the record including a fixed member and a movable member, a slide bar interposed between said members, and toggle links connecting said members with the slide bar; an electro-magnet adapted to shift said bar to expand said device; an electro-magnet adapted to shift said bar to collapse said device; and means for selectively controlling the energization of said magnets.

In testimony whereof, I have hereunto signed my name at Philadelphia, Pennsylvania, this twenty-fourth day of October 1917.

GEORGE H. UNDERHILL.

Witnesses:
 JAMES H. BELL,
 E. L. FULLERTON.